(12) United States Patent
Tanabe

(10) Patent No.: US 9,131,139 B2
(45) Date of Patent: Sep. 8, 2015

(54) IMAGE SENSING APPARATUS, CONTROL METHOD AND RECORDING MEDIUM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 13/727,759

(22) Filed: Dec. 27, 2012

(65) Prior Publication Data

US 2013/0182133 A1 Jul. 18, 2013

(30) Foreign Application Priority Data

Jan. 13, 2012 (JP) .................................. 2012-005657

(51) Int. Cl.
*H04N 5/225* (2006.01)
*H04N 5/222* (2006.01)
*H04N 5/232* (2006.01)

(52) U.S. Cl.
CPC ................................ *H04N 5/23203* (2013.01)

(58) Field of Classification Search
CPC .................................................. H04N 5/23203
USPC ....................... 348/207.1, 211.1, 211.2, 220.1
See application file for complete search history.

(56) References Cited

U.S. PATENT DOCUMENTS

| 8,659,667 B2 * | 2/2014 | Syed et al. ................. 348/207.1 |
| 2008/0303921 A1 * | 12/2008 | Kim ........................... 348/231.7 |
| 2009/0231441 A1 * | 9/2009 | Walker et al. .............. 348/207.1 |

FOREIGN PATENT DOCUMENTS

JP 2003-259281 A 9/2003

* cited by examiner

*Primary Examiner* — Trung Diep
(74) *Attorney, Agent, or Firm* — Carter, DeLuca, Farrell & Schmidt, LLP

(57) ABSTRACT

One of a plurality of image sensing modes is set, and an image sensing process including a plurality of processes is performed based on the set image sensing mode. Whether or not each of the plurality of processes is to be performed by an external apparatus is decided based on the set image sensing mode. Image data obtained by image sensing is transmitted to the external apparatus so that the decided process is performed by the external apparatus.

18 Claims, 13 Drawing Sheets

F I G. 3
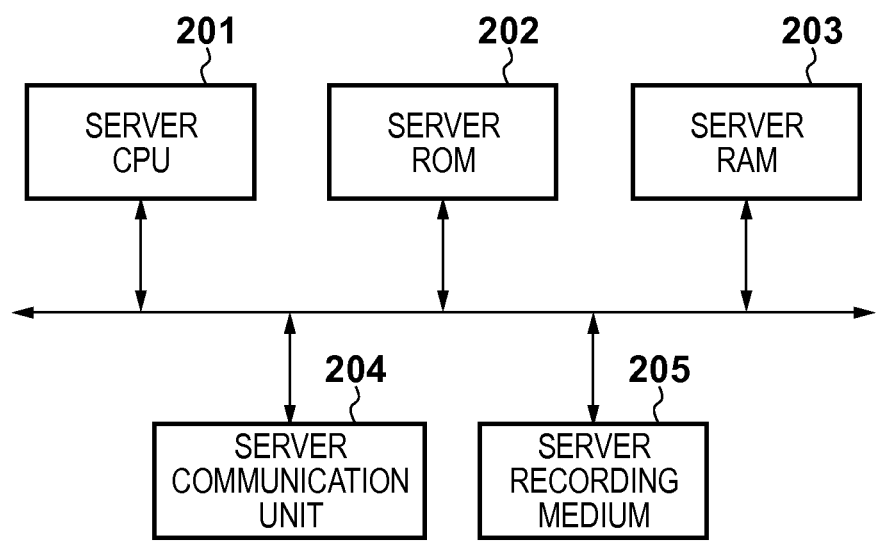

FIG. 4

| IMAGING MODE | IMAGE RECOGNITION PROCESS | IMAGE EFFECT APPLYING PROCESS | ENCODING PROCESS | RECORDING PROCESS | DECODING PROCESS | PLAYBACK CONTROLLING PROCESS |
|---|---|---|---|---|---|---|
| PERSON | EXTERNAL | INTERNAL | INTERNAL | INTERNAL | INTERNAL | INTERNAL |
| LANDSCAPE | INTERNAL | EXTERNAL | EXTERNAL | EXTERNAL | EXTERNAL | EXTERNAL |
| AQUARIUM | INTERNAL | EXTERNAL | EXTERNAL | EXTERNAL | EXTERNAL | EXTERNAL |
| FIREWORKS | INTERNAL | EXTERNAL | INTERNAL | INTERNAL | EXTERNAL | EXTERNAL |
| SPORTS | INTERNAL | INTERNAL | INTERNAL | INTERNAL | INTERNAL | INTERNAL |

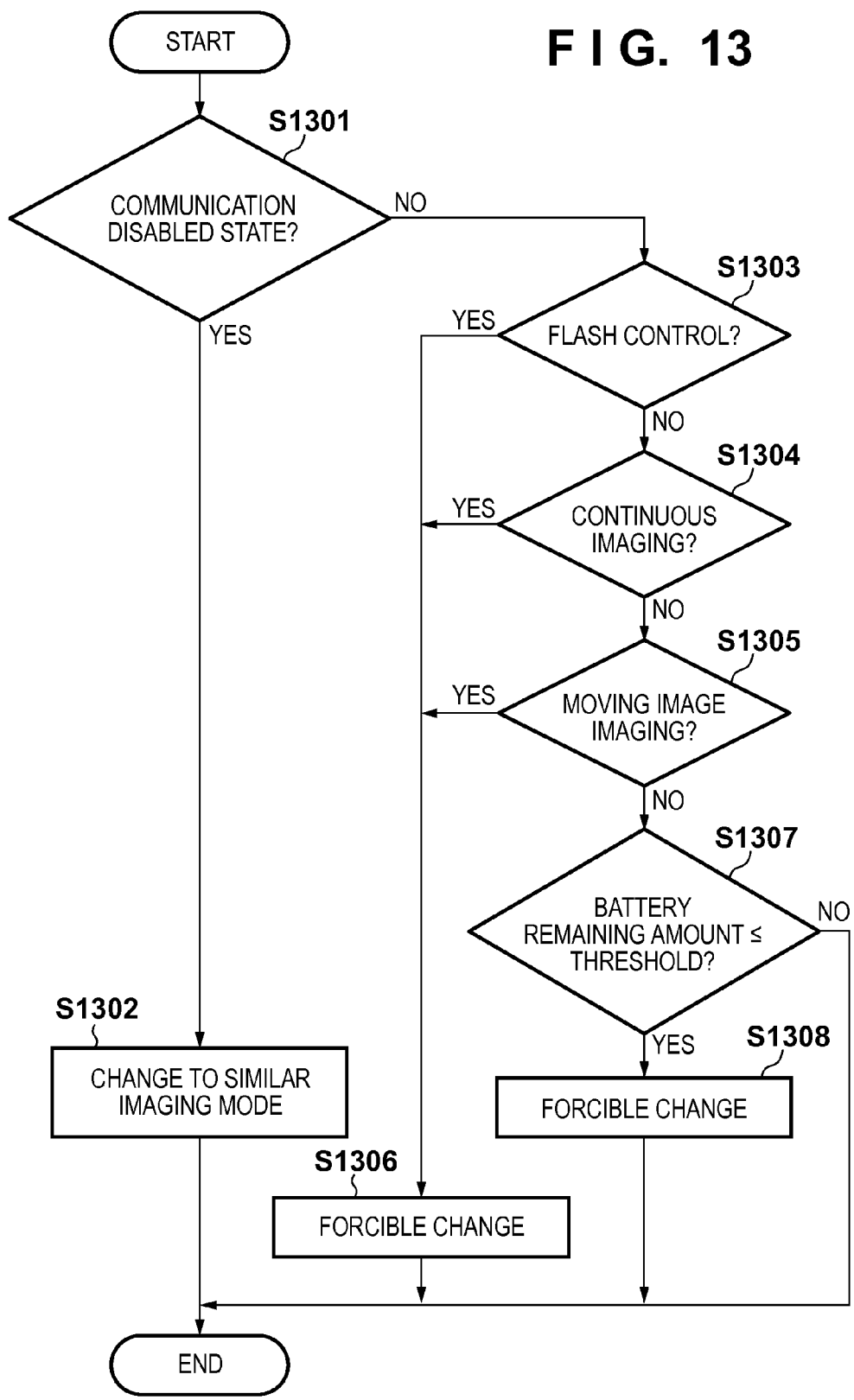

IMAGE SENSING APPARATUS, CONTROL METHOD AND RECORDING MEDIUM

BACKGROUND OF THE INVENTION

1. Field of the Invention

The present invention relates to an image sensing apparatus, control method, and recording medium, and particularly to a technique of using processing functions provided by a cloud service.

2. Description of the Related Art

An image sensing apparatus such as a digital camera is composed of various hardware components which perform processes associated with imaging and recording of images or playback of recorded images. That is, when such processes are performed in the image sensing apparatus, all of these processes are completed by those in the hardware components in the image sensing apparatus.

On the other hand, functions and performance of image sensing apparatuses have been improved along with the appearance of new models, and the user has to get an image sensing apparatus of a new model so as to use such improved performance and functions. However, in general, it is not practical for the user to purchase an image sensing apparatus he or she purchased every time a new model appears. For this reason, it is demanded to upgrade only some functions of the image sensing apparatus currently possessed by the user.

Japanese Patent Laid-Open No. 2003-259281 discloses a technique for outputting Raw data obtained by imaging of the image sensing apparatus together with additional information related to a development process to a server, and making the server perform that process. That is, since the image sensing apparatus of Japanese Patent Laid-Open No. 2003-259281 can make the server perform the development process of processes associated with imaging and recording of images, the function of the development process can be upgraded depending on the implementation of the server.

However, it is decided in the aforementioned image sensing apparatus of Japanese Patent Laid-Open No. 2003-259281 to make the server entirely perform the development process. That is, the user cannot select or change a process to be performed by the server (for example, only a partial process of the development process desired by the user is to be performed by the server).

SUMMARY OF THE INVENTION

The present invention has been made in consideration of the aforementioned conventional problems. The present invention provides an image sensing apparatus, control method, and recording medium, which allow the user to easily select and change processes to be performed by an external apparatus or an image sensing apparatus in association with those to be implemented by the image sensing apparatus.

The present invention in its first aspect provides an image sensing apparatus comprising: a setting unit configured to set one of a plurality of image sensing modes; an image sensing unit configured to perform an image sensing process based on the image sensing mode set by the setting unit, the image sensing processing including a plurality of processes; a communication unit configured to communicate with an external apparatus; and a determination unit configured to determine, based on the image sensing mode set by the setting unit, a process to be performed by the external apparatus out of the plurality of processes, wherein the communication unit transmits image data obtained by the image sensing unit to the external apparatus so that the process determined by the determination unit is performed by the external apparatus Further features of the present invention will become apparent from the following description of exemplary embodiments (with reference to the attached drawings).

BRIEF DESCRIPTION OF THE DRAWINGS

FIG. 3 is a block diagram showing the functional arrangement of a server according to the embodiment of the present invention;

FIG. 4 shows a performance determination table according to the embodiment of the present invention;

FIG. 13 is a flowchart showing an example of an exception process according to the third embodiment of the present invention.

DESCRIPTION OF THE EMBODIMENTS

First Embodiment

Exemplary embodiments of the present invention will be described in detail hereinafter with reference to the drawings. Note that one embodiment will be described hereinafter wherein the present invention is applied to a digital camera as an example of an image sensing apparatus, which allows the user to select whether or not some of processes to be performed by the image sensing apparatus are performed by an external apparatus. However, the present invention is applicable to an arbitrary apparatus which can select whether or not some of processes to be performed in the apparatus are performed by an external apparatus. For example, the present invention is applicable to a so-called camera cell phone, tablet terminal, and the like.

<Configuration of Image Processing System>

Figure 1:
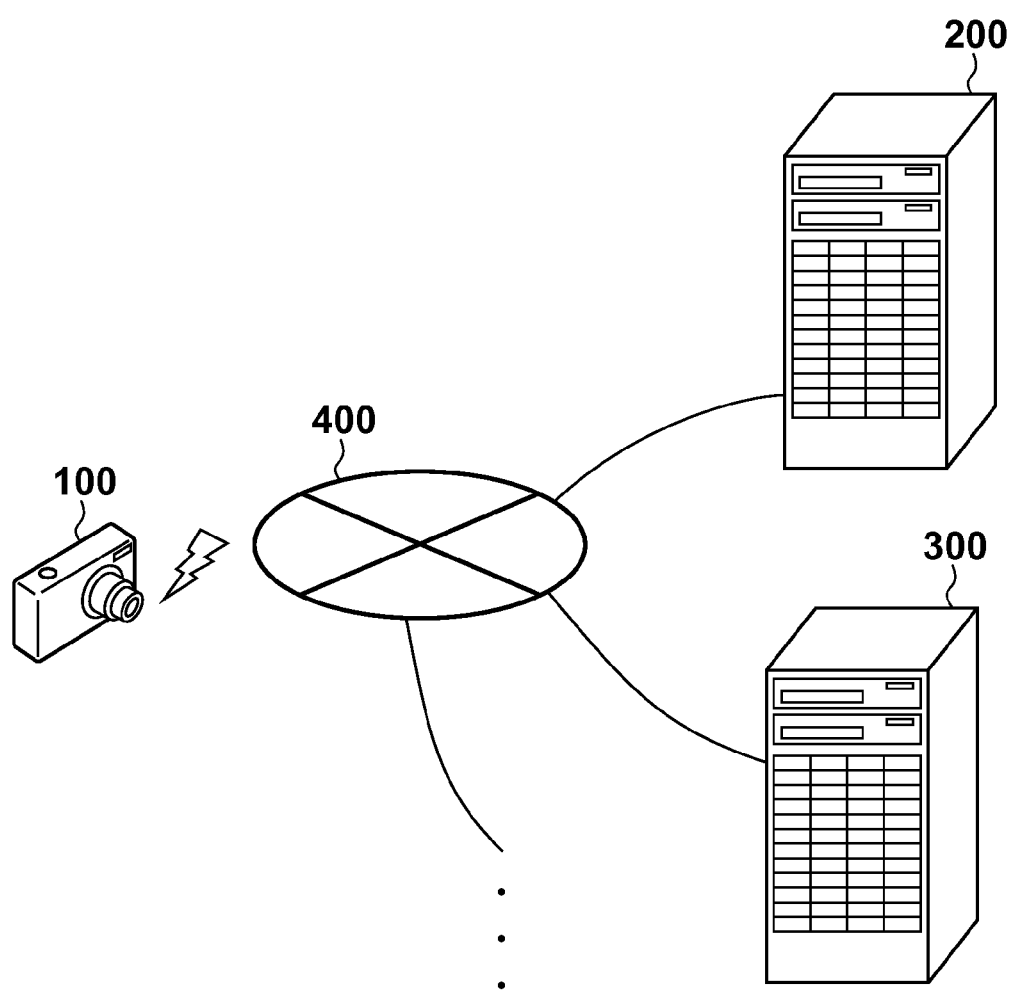
FIG. 1 is a view showing the system configuration of an image processing system according to an embodiment of the present invention.

FIG. 1 shows the system configuration of an image processing system according to an embodiment of the present invention.

The image processing system of this embodiment includes a digital camera 100, first server 200, and second server 300. The digital camera 100, first server 200, and second server 300 are connected to each other via a network 400. Note that a method, which is using the first and second servers 200 and 300 as external apparatuses which provide so-called cloud services associated with an image sensing apparatus, will be explained in this embodiment. However, it is easily anticipated that the number of external apparatuses is not limited to this. Also, in the following description of this embodiment, the digital camera 100 is connected to the external apparatuses via the network. Alternatively, the digital camera 100 may be directly connected to an external apparatus via a cable.

(Arrangement of Digital Camera 100)

Figure 2:
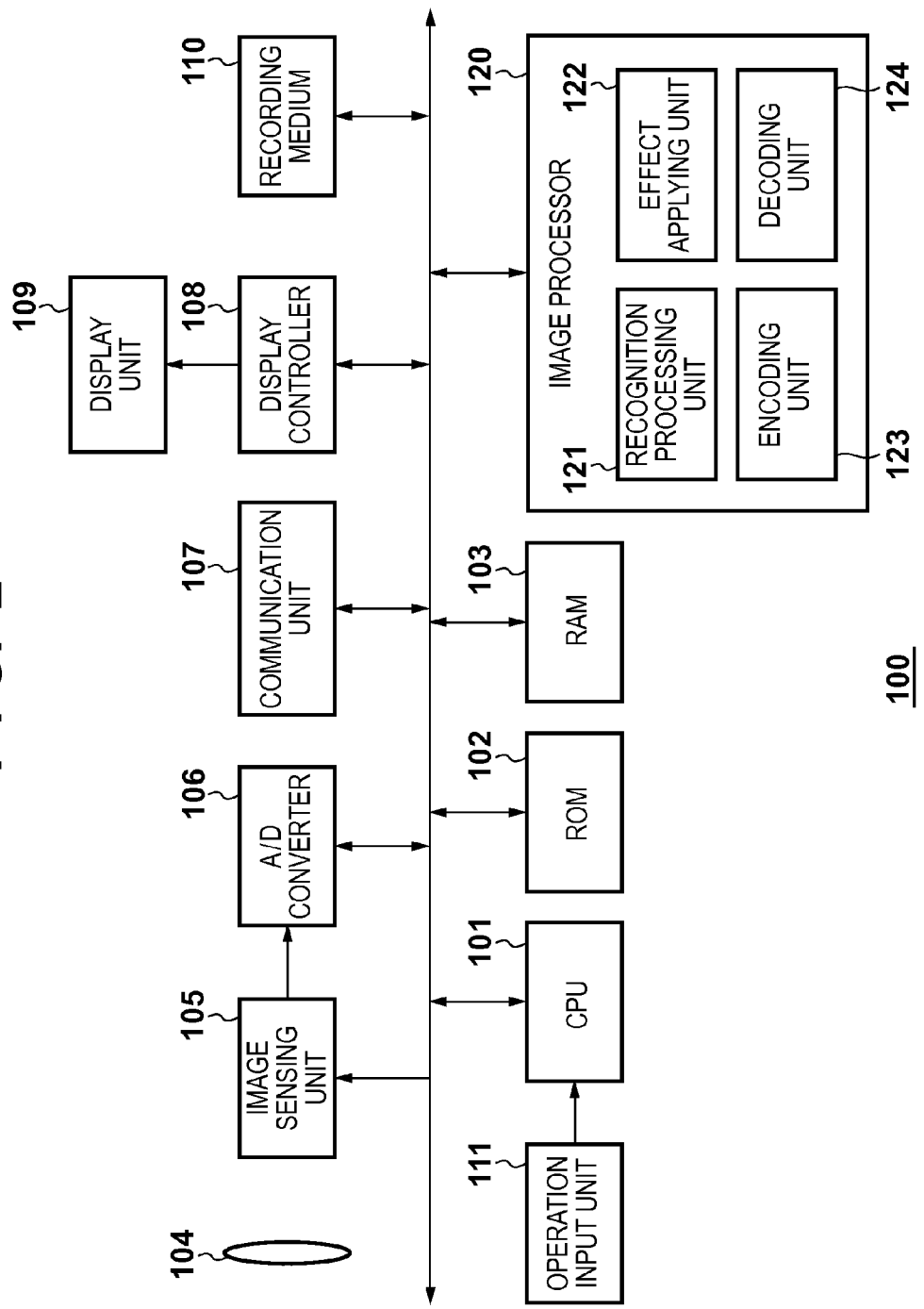
FIG. 2 is a block diagram showing the functional arrangement of a digital camera 100 according to the embodiment of the present invention.

FIG. 2 is a block diagram showing the functional arrangement of the digital camera 100 according to the embodiment of the present invention.

A CPU 101 controls respective blocks included in the digital camera 100. More specifically, the CPU 101 controls the operations of the respective blocks by reading out operation programs of an imaging process and playback process (to be described later) stored in a ROM 102, extracting the readout programs onto a RAM 103, and executing the extracted programs.

The ROM 102 is, for example, a rewritable nonvolatile memory. The ROM 102 stores operation programs of respective processes such as the imaging process and playback process to be performed by the digital camera 100. The ROM 102 also stores parameters and user setting information required for the operations of the respective blocks included in the digital camera 100.

The RAM 103 is a volatile memory. The RAM 103 is used not only as an extraction area of the operation programs of the respective blocks included in the digital camera 100 but also as a storage area used to store intermediate data and the like, which are output during the operations of the respective blocks.

An image sensing unit 105 is, for example, an image sensor such as a CCD or CMOS sensor. The image sensing unit 105 photoelectrically converts an optical image formed on a light-receiving surface by an image sensing optical system 104 into an analog image signal, and outputs the obtained analog image signal to an A/D converter 106.

The A/D converter 106 applies an A/D conversion process to the input analog image signal to obtain a digital image signal (image), and outputs the digital image signal. The output digital image signal is stored in the RAM 103. Note that "image" to be simply described in the following description indicates a digital image signal which is obtained via the A/D conversion process and to which digital signal processes are applicable.

A communication unit 107 included in the digital camera 100 is a communication interface with the first and second servers 200 and 300 as external apparatus. The communication unit 107 transmits an instruction for designating processes to be performed by the external apparatus and the like, or exchanges an image for which the external apparatus performs processes and that, which is generated when the external apparatus performs the processes, according to predetermined protocols.

A display unit 109 is, for example, a display device such as a compact LCD, which is included in the digital camera 100, and displays an image obtained by applying predetermined image processes after it is output from the A/D converter 106, an image recorded in a recording medium 110, or the like. A display timing, refresh timing, and the like of an image to be displayed on the display unit 109 are controlled by a display controller 108.

The recording medium 110 is, for example, an internal memory included in the digital camera 100 or a recording device such as an HDD or memory card, which is removably connected to the digital camera 100. An image obtained by the digital camera 100 is recorded in the recording medium 110 basically after predetermined processes are applied to that image.

An operation input unit 111 is a user interface such as a shutter button, mode dial, and menu button, which are included in the digital camera 100. When the operation input unit 111 detects an operation made by the user on each interface, it generates a control signal corresponding to that operation, and transfers it to the CPU 101.

An image processor 120 performs predetermined processes associated with recording or display for an image output from the A/D converter 106 after image sensing. The image processor 120 performs predetermined processes associated with display for an image read out from the recording medium 110 when the image is to be played back.

The following description of this embodiment will be given under the assumption that the following six processes are performed as the predetermined processes associated with imaging and playback:

1. image recording process;
2. image effect applying process;
3. encoding process;
4. recording process;
5. playback controlling process; and
6. decoding process.

FIG. 2 shows processes to be performed by the image processor 120 of these predetermined processes as a recognition processing unit 121, effect applying unit 122, encoding unit 123, and decoding unit 124. These units may be implemented by different hardware components, or the image processor 120 may load programs required to perform respective processes, and may function as the units 121 to 124.

The recognition processing unit 121 is a module which performs the image recognition process of the predetermined processes. More specifically, the recognition processing unit 121 extracts feature points from an image stored in the RAM 103, and then performs pattern matching to determine any of pre-set categories to which the image belongs. The recognition processing unit 121 may perform, for example, a process for detecting a face of a person, and specifying that person based on feature points of the face. Note that in the face detection process, the recognition process may be performed using a reduced-scale image, so as to reduce the processing load.

The effect applying unit 122 is a module which performs the image effect applying process of the predetermined processes. More specifically, the effect applying unit 122 performs processes associated with image effect adjustments such as white a balance adjustment and color correction for an image stored in the RAM 103. Assume that adjustment parameters used in these processes are stored in the RAM 103.

The encoding unit 123 is a module which performs the encoding process of the predetermined processes. More specifically, the encoding unit 123 performs the encoding process corresponding to a recording file format for an image stored in the RAM 103.

The decoding unit 124 performs the decoding process of the predetermined processes. More specifically, the decoding unit 124 performs the decoding process corresponding to the recording file format for a recorded image read out from, for example, the recording medium 110.

Note that the recording process and playback controlling process included in the aforementioned predetermined processes associated with imaging and playback are respectively a process for recording an image of the recording file format, which is encoded by the encoding unit 123, in the recording medium 110, and a process for performing playback control of an image recorded in the recording medium 110.

This embodiment controls whether these six processes as the predetermined processes are to be performed by the digital camera 100 or by either the first server 200 or second server 300. That is, each of the predetermined processes can be performed by the server (first and second servers 200 and 300). In this embodiment, the CPU 101 determines whether or not the respective processes are to be performed by the server depending on imaging modes, transfers an image before performance of the processes to be performed by the server, and instructs the server to perform the processes, as will be described later.

In the description of the present specification, the predetermined processes associated with imaging and playback include the aforementioned six processes. However, the present invention is not limited to such specific embodiment. That is, at least any of the aforementioned six processes may be assigned as the predetermined processes, processes other than the aforementioned six processes may be included, or one of the six processes may be further segmented to be included in the predetermined processes.

Control of the digital camera 100 is not limited to that using the respective control units shown in FIG. 2. For example, one hardware component may be assigned to the overall control of the digital camera 100. Alternatively, a plurality of hardware components may control the respective units of the digital camera 100 while sharing processes.

(Arrangement of Server)

FIG. 3 is a block diagram showing the functional arrangement of the first and second servers 200 and 300 according to the embodiment of the present invention. Note that the following description will be given under the assumption that the first and second servers 200 and 300 have the same functional arrangement shown in FIG. 3, and the functional arrangement of the first server 200 will be explained. That is, the following description will be given under the assumption that both the first and second servers 200 and 300 have capability of performing all of the aforementioned predetermined processes. However, the present invention is not limited to such specific embodiment, and the predetermined processes may be performed by any of external apparatuses connected to the digital camera 100 via a wireless communication or by a cable.

A server CPU 201 controls operations of respective blocks included in the first server 200. More specifically, the server CPU 201 controls the operations of the respective blocks by reading out operation programs for the predetermined processes, which are stored in a server ROM 202 or server recording medium 205, extracting the readout programs onto a server RAM 203, and executing the extracted programs. Assume that in the following description, the operation programs are stored in the server ROM 202.

The server ROM 202 is, for example, a rewritable nonvolatile memory. The server ROM 202 stores operation parameters required for the operations of the respective blocks in addition to the operation programs of the predetermined processes.

The server RAM 203 is a volatile memory. The server RAM 203 is not only used as an extraction area of the operation programs of the predetermined processes, but also stores intermediate data output during the operations of the respective blocks included in the first server 200.

A server communication unit 204 included in the first server 200 is a communication interface with the digital camera 100 and second server 300. The server communication unit 204 receives an instruction for designating an image and processes to be performed or transmits an image after performance of the processes according to the received instruction in accordance with predetermined protocols (second communication).

The server recording medium 205 is, for example, a recording device such as an HDD or SSD, which is removably connected to the first server 200. Upon reception of a performance instruction of a recording process of an image from the digital camera 100, that image is recorded in the server recording medium 205.

<Setting of Process Performing Device for Each Imaging Mode>

A main body for performing the predetermined processes associated with imaging and playback for each imaging mode included in the digital camera 100 according to this embodiment will be described below. As described above, for each of the predetermined processes to be performed for one image, a performance main body is different depending on an imaging mode set in the digital camera 100 which captured that image. That is, whether each of the predetermined processes is performed by the digital camera 100 or external apparatus (first and second servers 200 and 300) changes depending on the imaging mode set when a performance target image was captured. Assume that in this embodiment, a performance determination table, which indicates devices used to perform respective processes for respective imaging modes, as shown in FIG. 4, is stored in advance in the ROM 102. The CPU 101 refers to information of the imaging mode set when a performance target image of the predetermined processes was out in an imaging process or playback process (to be described later) and determines whether or not a main body of the respective processes in that imaging mode is the external apparatus. As shown in FIG. 4, for example, in a landscape mode, only the image recognition process is performed internally, that is, by the digital camera 100, and other processes are performed by the first or second server 200 or 300 as the external apparatus.

Assume that when that image is output from the A/D converter 106, the CPU 101 acquires information of the imaging mode set when the performance target image was output with reference to setting information, and stores that information in the RAM 103 in association with that image. Then, when that image is recorded, the information of the imaging mode associated with the image is recorded as, for example, header information in association with the recorded image.

<Imaging Process>

Figure 5:
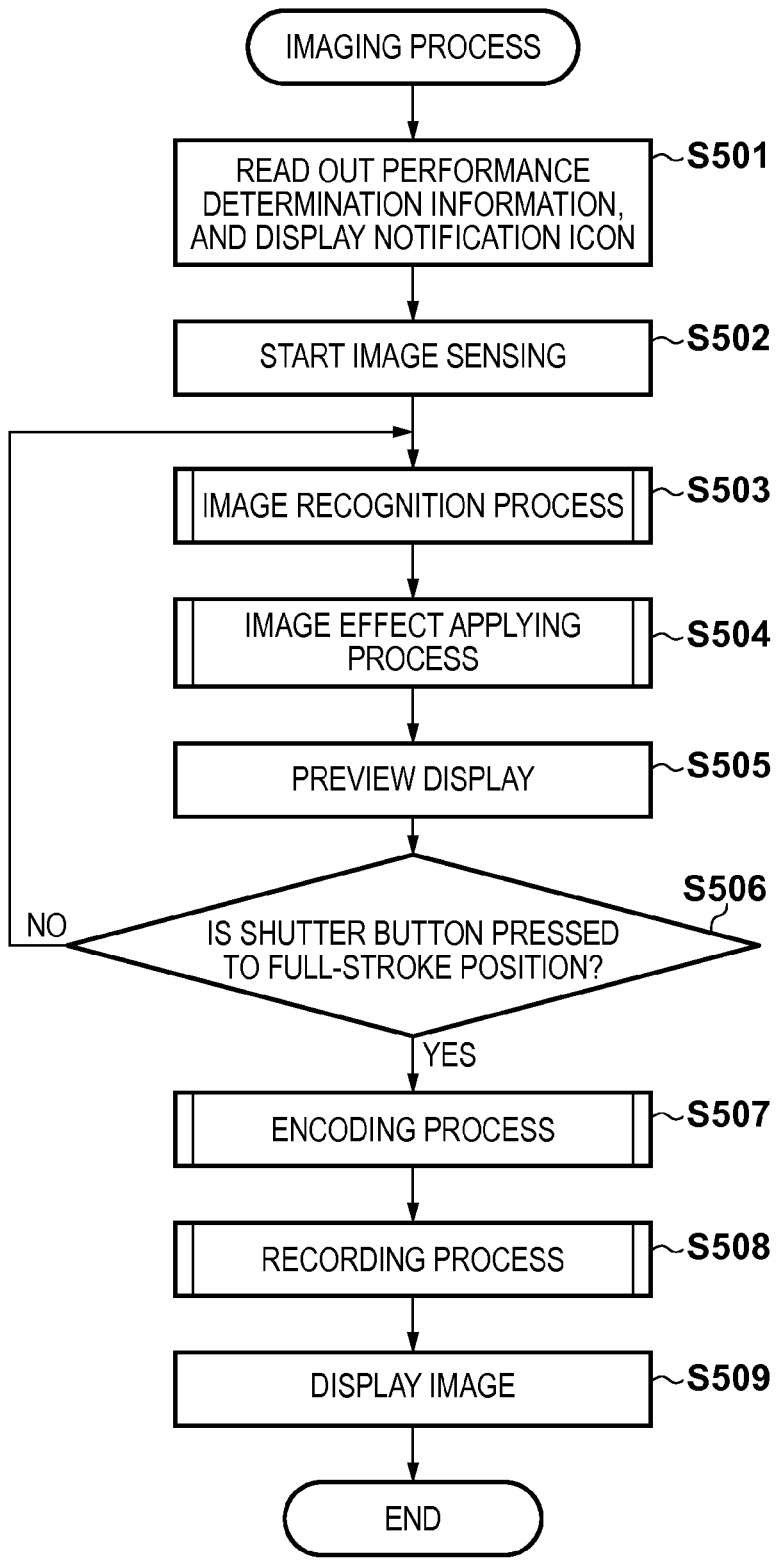
FIG. 5 is a flowchart showing an example of an imaging process according to the embodiment of the present invention.

The practical imaging process of the digital camera 100 of this embodiment with the aforementioned arrangement will be described below with reference to the flowchart shown in FIG. 5. The processing corresponding to this flowchart can be implemented when the CPU 101 reads out a corresponding processing program stored in, for example, the ROM 102, extracts the readout program onto the RAM 103, and executes the extracted program. Note that the following description will be given under the assumption that this imaging process is started, for example, when the digital camera 100 is activated while one of imaging modes set in advance in the digital camera 100 is selected.

In step S501, the CPU 101 acquires information of the current imaging mode set at the time of activation. Then, the CPU 101 instructs the display controller 108 to display, on the display unit 109, display icons which notify the user of processes to be performed by the digital camera 100 and those (to be performed by the external apparatus) using a cloud service. More specifically, the CPU 101 refers to the performance determination table stored in the ROM 102, and reads out information indicating whether each of processes associated with the current imaging mode is to be performed by the digital camera 100 or external apparatus (performance determination information) onto the RAM 103. Then, the CPU 101 refers to the performance determination information read out onto the RAM 103 to recognize the processes to be respectively performed by the digital camera 100 and external apparatus.

Figure 6:
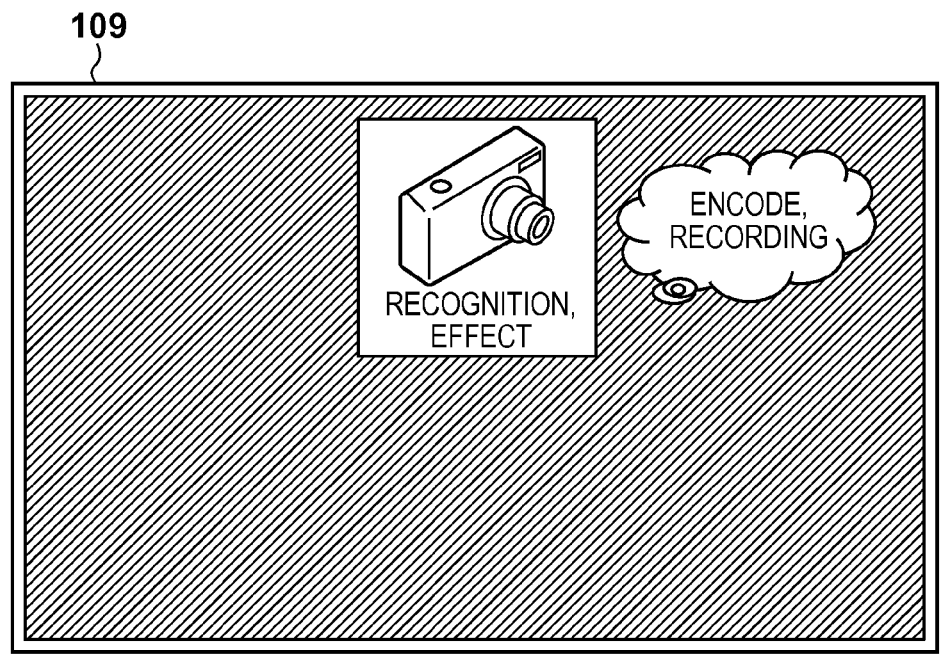
FIG. 6 shows an example of a GUI which notifies the user of a performance main body of processes in a current imaging mode according to the embodiment of the present invention.

The icons used to notify performance main bodies of the processes in the current imaging mode may be, for example, as shown in FIG. 6. FIG. 6 shows a display example when the image recognition process and image effect applying process are performed on the digital camera 100, and the external apparatus is instructed to perform the encoding process and recording process. As shown in FIG. 6, character strings "recognition" and "effect" indicating the image recognition process and image effect applying process are displayed on the display area of the display unit 109 to be superimposed on a camera-like icon. Also, character strings "encode" and "recording" indicating the encoding process and recording process are displayed on the display area to be superimposed on a cloud-like icon. Note that the screen display example is not limited to this. For example, when processes performed in the imaging process include those to be performed by the external apparatus using the cloud service, a cloud-like icon may be simply displayed.

In step S502, the CPU 101 starts to capture an image of an object. More specifically, the CPU 101 controls a timing signal generation circuit (not shown) to generate a timing signal, and controls the image sensing unit 105 to periodically output an analog image signal. The output analog image signal is converted into a digital image signal by the A/D converter 106, and the digital image signal is stored in the RAM 103.

In step S503, the CPU 101 performs the image recognition process for the image stored in the RAM 103.

(Performance Determination Process (in Imaging Mode))

Figure 7:
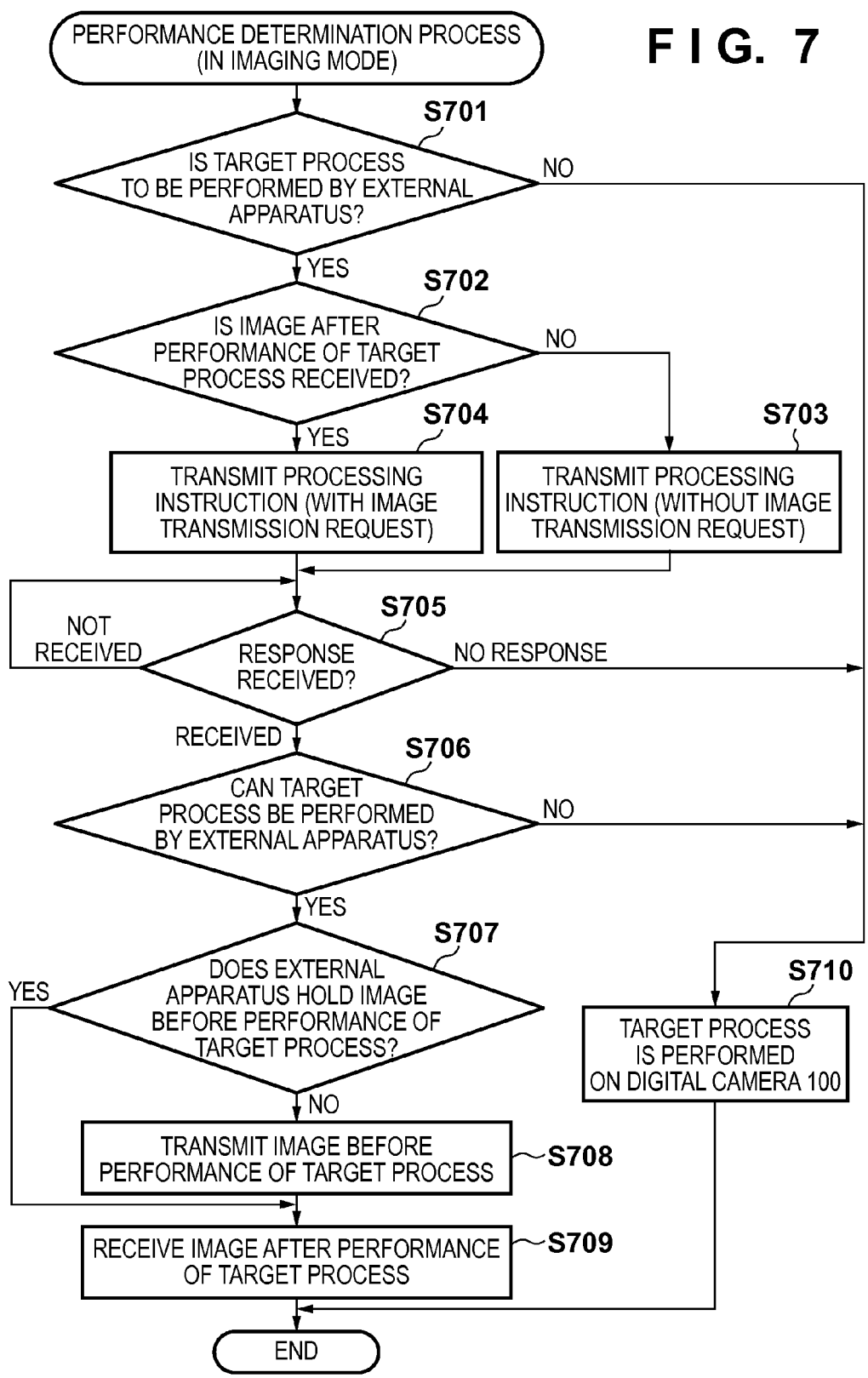
FIG. 7 is a flowchart showing an example of a performance determination process (in an imaging mode) according to the embodiment of the present invention.

The performance determination process (in an imaging mode), which is performed before performance of each of the predetermined processes for a captured image, and determines whether that process is performed by the digital camera 100 or external apparatus will be described below with reference to FIG. 7.

The CPU 101 determines in step S701 whether or not to instruct the external apparatus to perform a target process. More specifically, the CPU 101 refers to the performance determination information read out onto the RAM 103 in step S501, and determines whether or not the information indicates to instruct the external apparatus to perform the target process. If the CPU 101 determines that it instructs the external apparatus to perform the target process, it advances the process to step S702; otherwise, that is, if the CPU 101 determines that the target process is performed the digital camera 100, it advances the process to step S710.

The CPU 101 determines in step S702 whether or not an image after the target process performed by the external apparatus is required to be received. More specifically, the CPU 101 refers to the performance determination information stored in the RAM 103, and when the next predetermined process to be performed after the target process is performed by the digital camera 100, it determines that the image after performance is required to be received. That is, the predetermined processes are set with a performance order, and in this step, when the CPU 101 instructs the external apparatus to perform a subsequent process in that order, it determines that the image is not required to be received until the continuous processes are complete. On the other hand, when the image after performance of the target process is required to be previewed, the CPU 101 determines that the image after performance is required to be received. If the CPU 101 determines that the image after performance of the target process is required to be received, it advances the process to step S704; otherwise, to step S703.

In step S703, the CPU 101 generates information (processing instruction) which instructs the external apparatus to perform the target process, and transmits that information to the target external apparatus via the communication unit 107. Assume that the CPU 101 has already established a connection between the digital camera 100 and the first or second server 200 or 300 as the target external apparatus via the communication unit 107 at, for example, the activation timing of the digital camera 100. This connection may be established by specifying the first and second servers 200 and 300, or via a center server (not shown) without specifying the external apparatus.

On the other hand, in step S704, the CPU 101 transmits an instruction which requests the external apparatus to transmit the image after performance of the target process to the target external apparatus in addition to the processing instruction transmitted in step S703.

The CPU 101 determines in step S705 whether or not a response to the processing instruction transmitted to the target external apparatus in step S703 or S704 is received. In this embodiment, upon reception of the processing instruction, the first or second server 200 or 300 as the external apparatus returns information as to whether or not it can perform the process defined by the processing instruction as a response to the digital camera 100. If the CPU 101 determines that the response is received, it advances the process to step S706; otherwise, it repeats the process of this step. Note that if no response is returned even after an elapse of a predetermined time period in this step, the CPU 101 advances the process to step S710.

The CPU 101 determines in step S706 whether or not the response received in step S705 includes information indicating that the target external apparatus can perform the target process. If the response includes the information indicating that the target external apparatus can process the target process, the CPU 101 advances the process to step S707; otherwise, it advances the process to step S710.

The CPU 101 determines in step S707 whether or not the target external apparatus holds the image before performance of the target process. More specifically, when a process performed for the image immediately before the target process was performed in the digital camera 100, the CPU 101 determines that the target external apparatus does not hold the image before performance of the target process. Also, when no predetermined process is performed for the image, the CPU 101 also determines that the target external apparatus does not hold the image before performance of the target process. Note that the process performed for the image immediately before the target process does not include a display controlling process such as a preview display process. If the CPU 101 determines that the target external apparatus holds the image before performance of the target process, it advances the process to step S709; otherwise, to step S708.

In step S708, the CPU 101 reads out the image before performance of the target process from the RAM 103, transfers that image to the communication unit 107, and controls the communication unit 107 to transmit the image to the target external apparatus.

If the CPU 101 determines in step S702 that the image after performance of the target process is received, it waits in step S709 until the image is received from the target external apparatus via the communication unit 107. When the image is received from the target external apparatus via the communication unit 107, the CPU 101 stores the received image in the RAM 103, and ends this performance determination process. If it is determined in step S702 that the image after performance of the target process is not received, the CPU 101 can end the performance determination process without performing the process of this step.

On the other hand, if the target process is performed on the digital camera 100 (step S702), if the external apparatus cannot perform the target process (step S706), or if no response is returned from the external apparatus (step S705), the process advances to step S710. The CPU 101 determines in step S710 that the target process is performed on the digital camera 100, and ends this performance determination process.

In this manner, by performing this performance determination process before performance of each of the predetermined processes for the captured image, the CPU 101 determines whether that process is to be performed by the digital camera 100 or the external apparatus without being performed by the digital camera 100. That is, in step S503, after the CPU 101 performs the performance determination process in association with the image recognition process, it instructs the recognition processing unit 121 to perform the image recognition process if required.

Likewise, in step S504, after the CPU 101 performs the performance determination process in association with the image effect applying process, it instructs the effect applying unit 122 to perform the image effect applying process if required.

In step S505, the CPU 101 transfers a preview display image, which has undergone the image recognition process and image effect applying process, and is stored in the RAM 103, to the display controller 108, and controls the display controller 108 to display that image on the display unit 109.

The CPU 101 determines in step S506 whether or not the user has issued an imaging instruction. More specifically, the CPU 101 determines the presence/absence of the imaging instruction by checking whether or not an SW2 signal, which is output from the operation input unit 111 upon detection of pressing of a shutter button to a full-stroke position by the user, is received. If the CPU 101 determines that the user has issued the imaging instruction, it advances the process to step S507. If the CPU 101 determines that the user has not issued any imaging instruction, it returns the process to step S503 and performs the processes of steps S503 to S505 for the next image which is stored in the RAM 103 by the A/D converter 106 as a target.

In step S507, the CPU 101 performs the same processes as those of steps S503 and S504 for a recording image, which was captured by the image sensing unit 105 (main imaging), and was stored in the RAM 103 by the A/D converter 106 after reception of the imaging instruction. After that, the CPU 101 performs the performance determination process in association with the encoding process, and instructs the encoding unit 123 to perform the encoding process if required.

In step S508, the CPU 101 performs the performance determination process in association with the recording process, and then records the encoded image in the recording medium 110 as an image file if required. Note that when the recording process is performed by the external apparatus in this step, that is, when the image is recorded in the server recording medium 205 of the first or second server 200 or 300, only link information to the recorded image is transmitted from the external apparatus to the digital camera 100. In this case, the CPU 101 records the current imaging mode information in the recording medium 110 in association with the link information to the image received via the communication unit 107 and recorded in the external apparatus. That is, the recording process of this embodiment is that for recording, as an image file, the encoded image in the recording medium on the side of an apparatus which performed the process of the digital camera 100 and external apparatus.

In step S509, the CPU 101 displays the recording image obtained by the main imaging operation on the display unit 109. More specifically, the CPU 101 acquires the non-encoded recording image, transfers that image to the display controller 108, and controls the display controller 108 to display the image on the display unit 109. At this time, different processes are performed to acquire the non-encoded recording image under the following conditions.

1. When Encoding Process is Performed by Digital Camera 100

An image before the encoding process is held in the RAM 103, and the CPU 101 acquires that image and transfers the image to the display controller 108.

2. When Image Effect Applying Process is Performed by Digital Camera 100

An image after performance of the image effect applying process as that before the encoding process is held in the RAM 103, and the CPU 101 acquires that image and transfers the image to the display controller 108.

3. When Recording Process is Performed by Digital Camera 100 Except for Cases 1 and 2

An image after the encoding process is held in the RAM 103 or recorded in the recording medium 110. The CPU 101 performs the performance determination process in association with the decoding process, and then instructs the decoding unit 124 to generate a non-encoded image after the decoding process, thus acquiring the non-encoded image. Alternatively, the CPU 101 receives the image from the external apparatus via the communication unit 107, and transfers it to the display controller 108.

4. When Recording Process is Performed by External Apparatus Except for Cases 1 and 2

An image after the encoding process is held in the server RAM 203 of the external apparatus or recorded in the server recording medium 205. The CPU 101 performs the performance determination process in association with the decoding process, and then instructs the decoding unit 124 to generate a non-encoded image after the decoding process, thus acquiring the non-encoded image. Alternatively, the CPU 101 receives the image from the external apparatus via the communication unit 107, and transfers it to the display controller 108.

In this manner, whether or not the external apparatus is instructed to perform the series of predetermined processes associated with imaging in accordance with the imaging mode is controlled to record a captured image.

<Cloud Performance Process>

Figure 8:
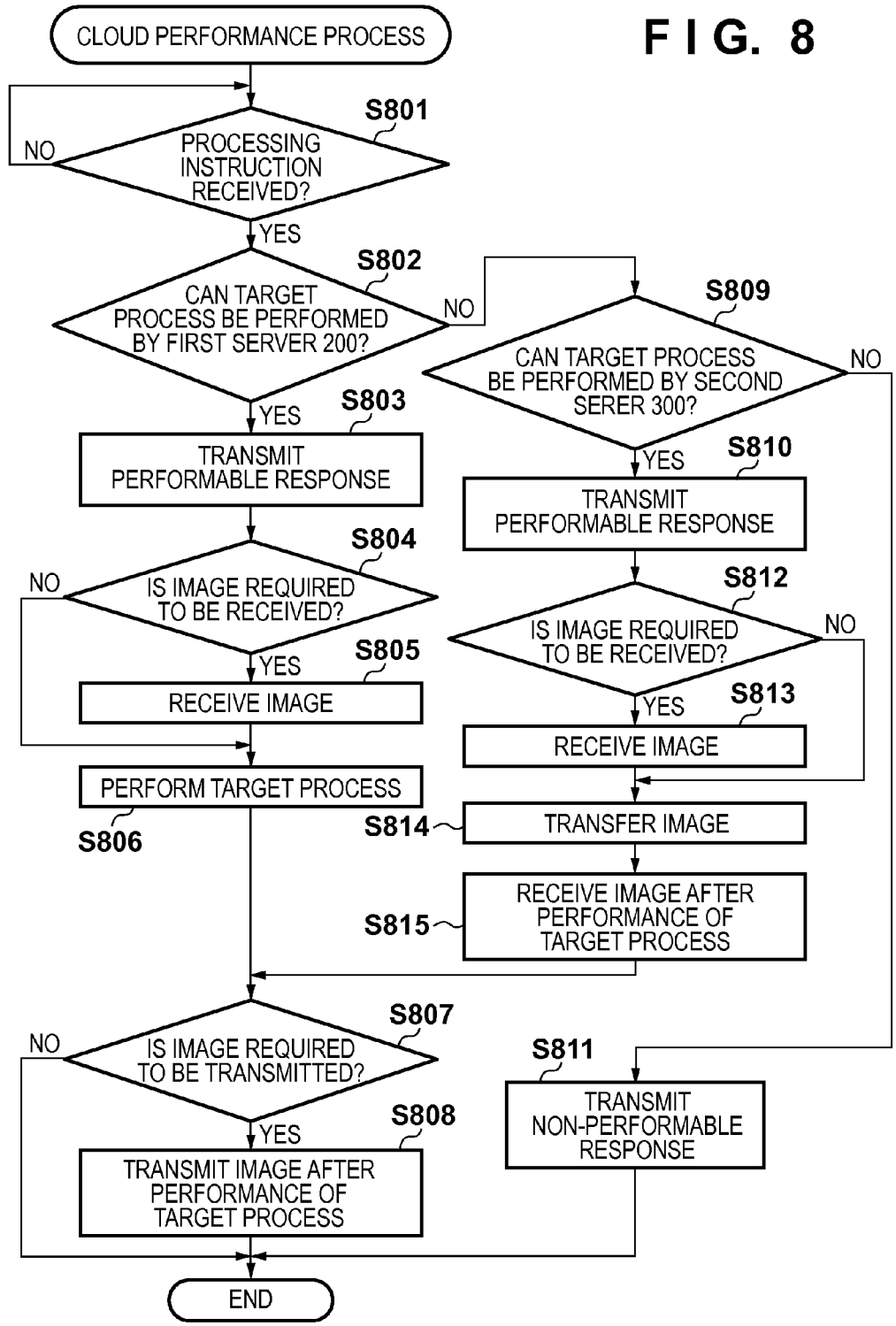
FIG. 8 is a flowchart showing an example of a cloud performance process according to the embodiment of the present invention.

The cloud performance process performed by the first and second servers 200 and 300 as the external apparatus at the time of performance of the aforementioned imaging process will be described below with reference to FIG. 8. The processing corresponding to this flowchart can be implemented when the server CPU 201 reads out a corresponding processing program stored in, for example, the server ROM 202, extracts the readout program onto the server RAM 203, and executes the extracted program. Note that the following description will be given under the assumption that this cloud performance process is started after, for example, the first or second server 200 or 300 is activated, and is performed repetitively. Also, the cloud performance process to be performed by the first server 200 will be described below for the sake of simplicity.

The server CPU 201 determines in step S801 whether or not the processing instruction is received from the digital camera 100 via the server communication unit 204. If the processing instruction is received from the digital camera 100, the server CPU 201 stores the processing instruction in the server RAM 203, and then advances the process to step S802; otherwise, repeats the process of this step.

The server CPU 201 determines in step S802 whether or not the first server 200 can perform a target process, performance of which is instructed by the processing instruction. More specifically, if an operation program corresponding to the target process is stored in the server RAM 203, the server CPU 201 determines that the first server 200 can perform the target process. If the server CPU 201 determines that the first server 200 can perform the target process, it advances the process to step S803; otherwise, to step S809.

In step S803, the server CPU 201 transmits a response including information indicating that the first server 200 can perform the target process, performance of which is instructed by the processing instruction, to the digital camera 100 via the server communication unit 204.

The server CPU 201 determines in step S804 whether or not an image which is to undergo the target process is required to be received. More specifically, the server CPU 201 has information of a performance order of each of the predetermined processes associated with imaging in the server ROM 202, and can determine that the image is required to be received when no process is performed immediately before the target process. Also, if the processing instruction includes information indicating that an image is to be transmitted, the server CPU 201 can determine that the image is required to be received. If the server CPU 201 determines that the image which is to undergo the target process is required to be received, it advances the process advances to step S805; otherwise, to step S806.

In step S805, the server CPU 201 waits until the server communication unit 204 receives the image which is to undergo the target process from the digital camera 100. If the image which is to undergo the target process is received, the server CPU 201 stores that image in the server RAM 203, and the process then advances to step S806.

In step S806, the server CPU 201 reads out the operation program of the target process from the server ROM 202, extracts the readout program onto the server RAM 203, and performs the target process for the image which is to undergo the target process and is stored in the server RAM 203. After performance of the target process, the server CPU 201 stores the image after performance in the server RAM 203.

The server CPU 201 determines in step S807 with reference to the processing instruction stored in the server RAM 203 in step S801 whether or not the processing instruction includes a transmission request of the image after performance of the target process. If the server CPU 201 determines that the processing instruction includes a transmission request of the image after performance of the target process, it advances the process to step S808; otherwise, it ends this cloud performance process.

In step S808, the server CPU 201 transfers the image after performance of the target process, which image is stored in the server RAM 203, to the server communication unit 204, and controls the server communication unit 204 to transmit the image to the digital camera 100.

If it is determined in step S802 that the first server 200 cannot perform the target process, the server CPU 201 determines in step S809 whether or not another external apparatus on the network 400 can perform the target process. More specifically, the server CPU 201 transfers the processing instruction to the second server 300 as another external apparatus on the network 400, and receives a response to the processing instruction from the second server 300 via the server communication unit 204. Then, the server CPU 201 determines whether or not the response received from the second server 300 includes information indicating that the second server 300 can perform the target process. If the server CPU 201 determines that the second server 300 can perform the target process, it advances the process to step S810; otherwise, to step S811.

In step S810, the server CPU 201 transmits a response including information indicating that the target process, performance of which is instructed by the processing instruction, can be performed to the digital camera 100 via the server communication unit 204. On the other hand, in step S811, the server CPU 201 transmits a response including information indicating that the target process, performance of which is instructed by the processing instruction, cannot be performed to the digital camera 100 via the server communication unit 204, thus ending this cloud performance process.

The server CPU 201 determines in step S812 whether or not an image which is to undergo the target process is required to be received. If the server CPU 201 determines that the image which is to undergo the target process is required to be received, it advances the process to step S813; otherwise, to step S814.

In step S813, the server CPU 201 waits until the server communication unit 204 receives the image which is to undergo the target process from the digital camera 100. If the image which is to undergo the target process is received, the server CPU 201 transfers the image to the server communication unit 204, and controls the server communication unit 204 to transmit the image to the second server 300 in step S814.

In step S815, the server CPU 201 waits until the server communication unit 204 receives the image after performance of the target process from the second server 300. If the image after performance of the target process is received, the server CPU 201 stores that image in the server RAM 203, and the process then advances to step S807.

In this way, each of the predetermined processes associated with imaging can be performed using the first and second servers 200 and 300 on the network 400 as the external apparatuses. Note that this cloud performance process can cope with predetermined processes associated with playback in addition to those associated with imaging, as is easily anticipated.

<Playback Process>

Figure 9:
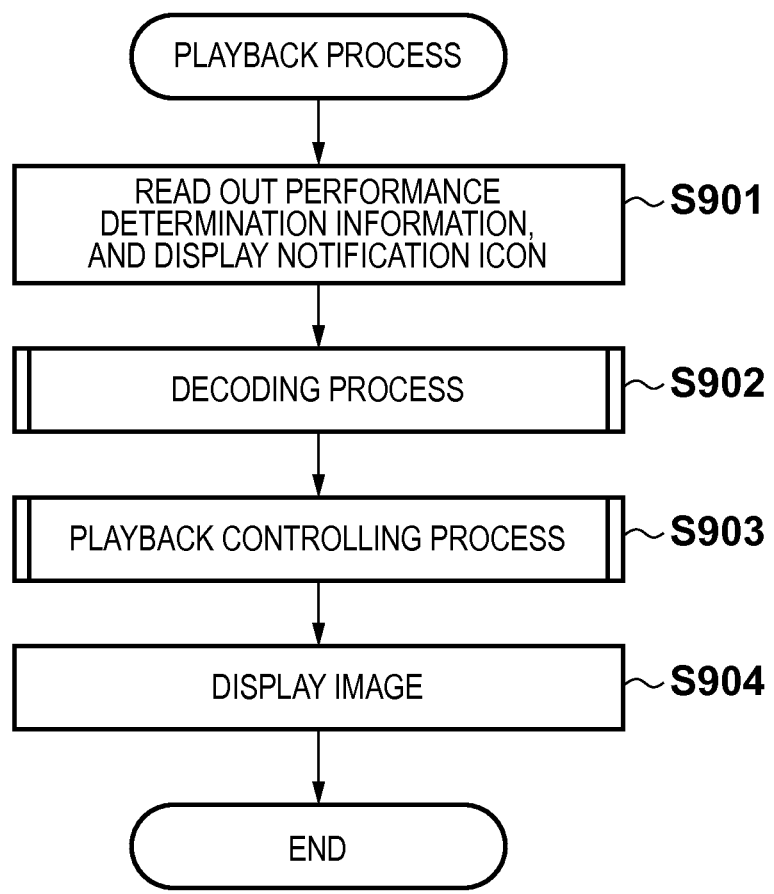
FIG. 9 is a flowchart showing an example of a playback process according to the embodiment of the present invention.

The practical playback process of the digital camera 100 of this embodiment will be described below with reference to the flowchart shown in FIG. 9. The processing corresponding to this flowchart can be implemented when the CPU 101 reads out a corresponding processing program stored in, for example, the ROM 102, extracts the readout program onto the RAM 103, and executes the extracted program. Note that the following description will be given under the assumption that this playback process is started when the digital camera 100 is activated while it is set in the playback mode.

In step S901, the CPU 101 acquires information of an imaging mode (imaging mode at an image sensing timing) which is associated with a target image to be played back and to be displayed on the display unit 109 out of those recorded in the recording medium 110, and which mode was set in the digital camera 100 at the image sensing timing of the target image. Then, the CPU 101 refers to the performance determination table stored in the ROM 102, and reads out performance determination information associated with the imaging mode at the image sensing timing onto the RAM 103. The CPU 101 refers to the performance determination information read out onto the RAM 103 to confirm processes to be respectively performed by the digital camera 100 and external apparatus. The CPU 101 controls the display controller 108 to display, on the display unit 109, the display icons which notify the user of the processes to be performed by the digital camera 100 and those to be performed by the external apparatus in the imaging mode at the image sensing timing. Note that the target image to be displayed on the display unit 109 in this step includes link information of an image recorded in the external apparatus. In this case, the CPU 101 acquires information of an imaging mode at the image sensing timing of the image indicated by the link information, which mode is associated with the link information.

In step S902, the CPU 101 performs the decoding process for the target image.

(Performance Determination Process (in Playback Mode))

Figure 10:
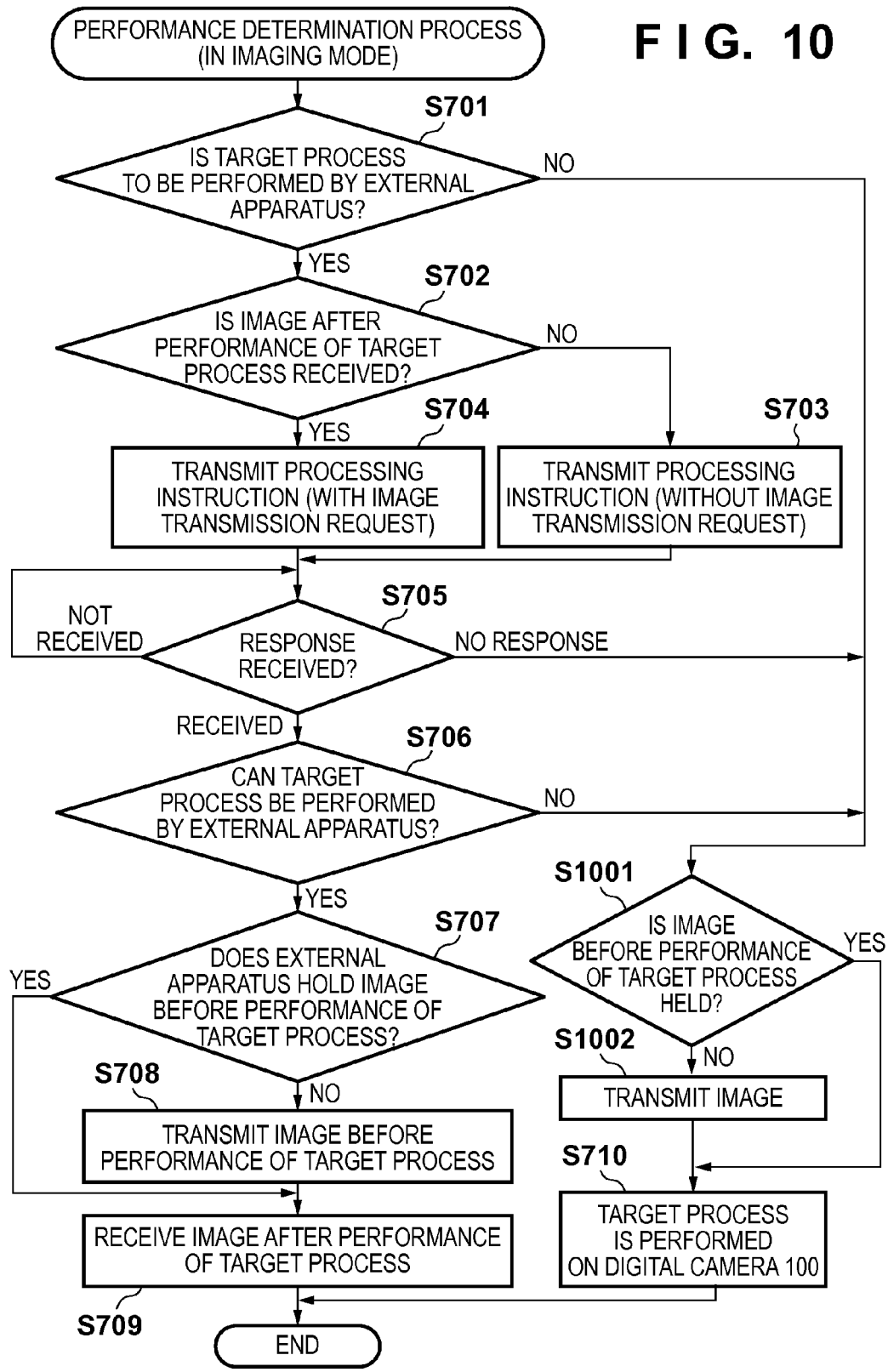
FIG. 10 is a flowchart showing an example of a performance determination process (in a playback mode) according to the embodiment of the present invention.

The performance determination process (in the playback mode) which is performed before performance of each of the predetermined processes for the target image, and is required to determine which of the digital camera 100 and external apparatus that process is performed on, will be described below with reference to FIG. 10. Note that in this performance determination process (in the playback mode), the same reference numerals denote steps which perform the same processes as those in the aforementioned performance determination process (in the imaging mode), and a description thereof will not be repeated. Only steps as characteristic features of the performance determination process (in the playback mode) will be explained.

If the target process is performed on the digital camera 100 (step S702), if the external apparatus cannot perform the target process (step S706), or if no response is returned from the external apparatus (step S705), the CPU 101 advances the process to step S1001.

The CPU 101 determines in step S1001 whether or not the digital camera 100 holds an image before performance of the target process. More specifically, the CPU 101 determines whether or not the image before performance of the target process is recorded in the recording medium 110. If the target image is recorded in the recording device of the external apparatus, the digital camera 100 has only link information associated with the image before performance of the target process in a state in which none of the predetermined processes is performed on the digital camera 100. That is, the CPU 101 determines in this step whether or not an image before performance of the target process when the digital camera 100 is to perform the decoding process to be performed first out of the predetermined processes associated with playback is required to be acquired from the external apparatus. If the CPU 101 determines that the digital camera 100 holds the image before performance of the target image, it advances the process to step S710; otherwise, to step S1002.

In step S1002, the CPU 101 transmits a transmission request of the image to the external apparatus specified by the link information of the image before performance of the target process via the communication unit 107, and waits until the image is received. Then, if the image is received from the external apparatus specified by the link information, the CPU 101 stores the image in the RAM 103, and the process then advances to step S710.

By performing the performance determination process (in the playback mode) in the same manner as in the imaging process before performance of each of the predetermined processes in the playback process, the CPU 101 determines whether each process is to be performed by the digital camera 100 or external apparatus. In step S902, the CPU 101 performs the performance determination process in association with the decoding process, and then controls the decoding unit 124 to perform the decoding process if required. Note that when the decoding process is performed on the digital camera 100, and when an image before performance of the target process is not recorded in the recording medium 110, the CPU 101 receives that image by performing the performance determination process.

In step S903, the CPU 101 performs the performance determination process in association with the playback controlling process, and performs the playback controlling process of the decoded image if required. Note that the playback controlling process of this embodiment is content playback control associated with the target image in response to a user instruction (operation input). More specifically, when the target image is a moving image, the playback controlling process corresponds to those performed in response to operation inputs such as playback, stop, pause, fast-forward, rewind, and frame-by-frame playback. When the target image is a still image, the playback controlling process corresponds to those performed in response to operation inputs such as playback, stop, slideshow, zoom-in, and zoom-out.

In step S904, the CPU 101 displays the image obtained by the playback controlling process on the display unit 109. More specifically, the CPU 101 reads out the image after performance of the playback controlling process from the RAM 103, transfers that image to the display controller 108, and controls the display controller 108 to display the image on the display unit 109.

As described above, the image sensing apparatus of this embodiment can easily change whether the processes of the image sensing apparatus are to be performed by the external apparatus or the image sensing apparatus. More specifically, the image sensing apparatus acquires information indicating the imaging mode set in the image sensing apparatus when an image obtained by capturing an image of an object was output. The image sensing apparatus refers to information indicating processes to be performed by the external apparatus in association with the imaging mode set in the image sensing apparatus when the image was output for each of the predetermined processes to be performed for the image, and decides whether or not that process is to be performed by the external apparatus. Then, as for the process decided to be performed by the external apparatus out of the predetermined processes, the image sensing apparatus transmits the image before performance of that process and performance instruction information of that process to the corresponding external apparatus, and receives the image after performance of the process from the external apparatus.

In this way, whether or not each of the predetermined processes to be performed for an image obtained by imaging is to be performed by the image sensing apparatus or the external apparatus can be decided according to the imaging mode. That is, the user who uses the image sensing apparatus can easily change performance of the predetermined processes by switching the imaging mode.

Second Embodiment

The aforementioned embodiment has explained the case in which the information indicating whether each of the predetermined processes associated with imaging and playback is to be performed by either the digital camera 100 or external apparatus is set in advance in association with each imaging mode. This embodiment will explain a mode in which the user can manually set whether each of the predetermined processes for each imaging mode is to be performed by either the digital camera 100 or external apparatus.

The user makes settings about whether each of the predetermined processes is to be performed by the digital camera 100 or external apparatus by operating operation buttons while observing a cloud performance process menu (not shown) displayed on the display unit 109. The cloud performance process menu allows the user to set whether or not a cloud service is used for each of the predetermined processes, that is, the process is to be performed by the external apparatus.

<Manual Setting Process>

Figure 11:
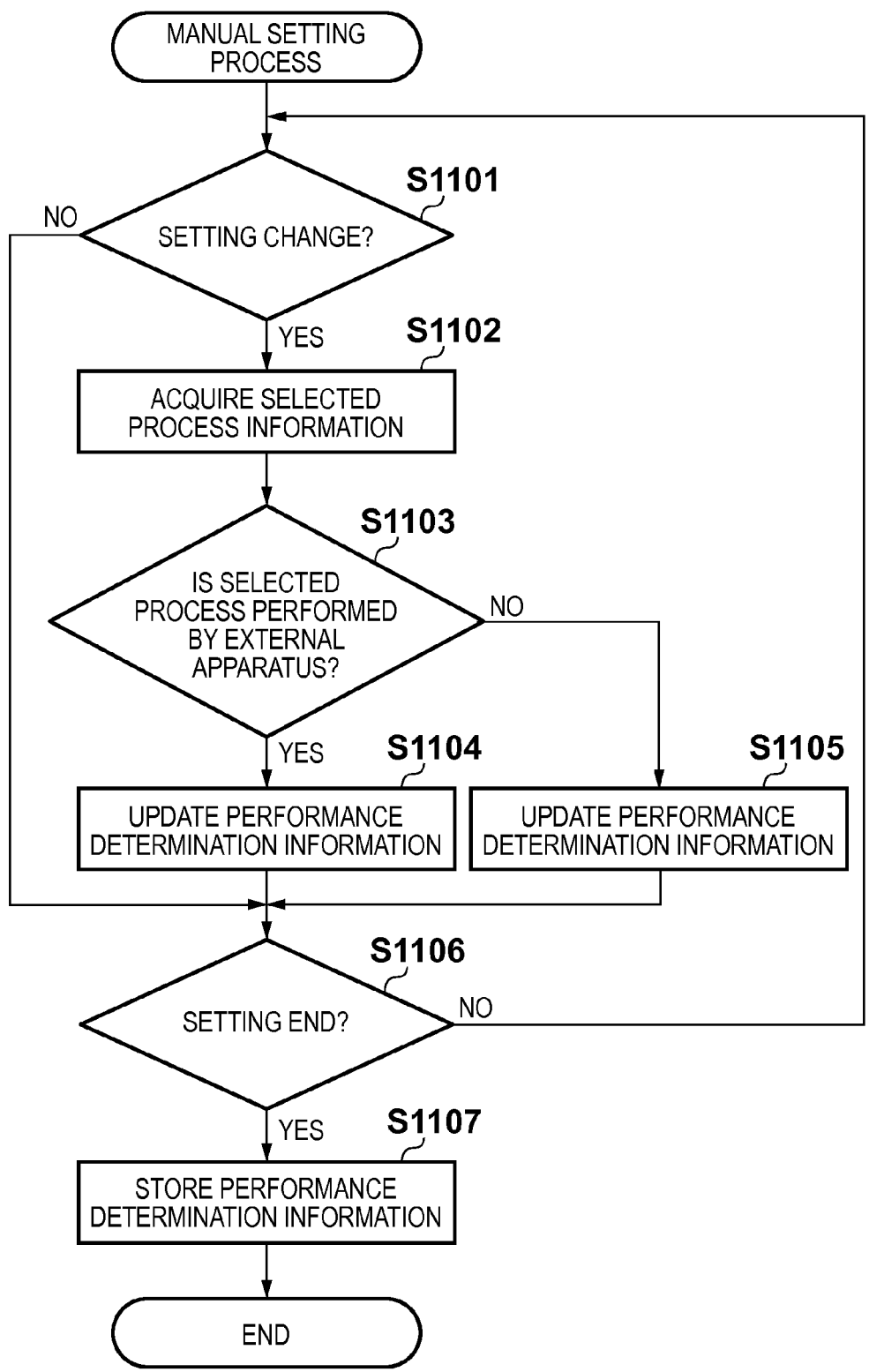
FIG. 11 is a flowchart showing an example of a manual setting process according to the second embodiment of the present invention.

A practical manual setting process of the digital camera 100 of this embodiment will be described below with reference to the flowchart shown in FIG. 11. The processing corresponding to this flowchart can be implemented when the CPU 101 reads out a corresponding processing program stored in, for example, the ROM 102, extracts the readout program onto the RAM 103, and executes the extracted program. Note that the following description will be given under the assumption that this manual setting process is started, for example, when the CPU 101 receives, from the operation input unit 111, a control signal indicating that the user inputs a display instruction of the cloud performance process menu.

Assume that the cloud performance process menu of this embodiment allows the user to set information indicating whether or not each of the predetermined processes is to be performed by the external apparatus. When it is detected based on the control signal from the operation input unit 111 that the display instruction of the cloud performance process menu is input, the CPU 101 refers to the performance determination table stored in the ROM 102. Then, assume that the CPU 101 reads out the performance determination information associated with the current imaging mode in the performance determination table onto the RAM 103.

The CPU 101 determines in step S1101 whether or not an input related to a setting change of information indicating whether or not each of the predetermined processes is to be executed by the external apparatus is made. More specifically, the CPU 101 determines whether or not the input related to the setting change is made by checking whether or not a control signal output from the operation input unit 111 at the time of issuance of a setting change instruction is received. If the CPU 101 determines that the input related to the setting change is made, it advances the process to step S1102; otherwise, to step S1106.

In step S1102, the CPU 101 acquires information of one process (selected process) of the predetermined processes, which process was selected on the cloud performance process menu when the input related to the setting change was made. Assume that the information indicating the process selected when the input related to the setting change was made is stored in the RAM 103. Also, assume that this information is updated when the CPU 101 receives a control signal related to a selected process change from the operation input unit 111.

The CPU 101 determines in step S1103 whether or not performance of the selected process acquired in step S1102 is assigned to the external apparatus. More specifically, the CPU 101 refers to the performance determination information read out onto the RAM 103 to determine whether or not performance of the selected process is assigned to the external apparatus. If the CPU 101 determines that performance of the selected process is assigned to the external apparatus, it advances the process to step S1104; if the selected process is not assigned, that is, it is set as the digital camera 100 performs that process, it advances the process to step S1105.

In step S1104, the CPU 101 updates the information associated with the selected process in the performance determination information read out onto the RAM 103 by information indicating that performance of the selected process is not assigned to the external apparatus. Likewise, in step S1105, the CPU 101 updates the information associated with the selected process in the performance determination information read out onto the RAM 103 by information indicating that performance of the selected process is assigned to the external apparatus.

The CPU 101 determines in step S1106 whether or not a setting end input in the cloud performance process menu is made. More specifically, the CPU 101 determines whether or not the setting end input is made by checking a control signal output from the operation input unit 111 at the time of issuance of a setting end instruction is received. If the CPU 101 determines that the setting end input is made, it advances the process to step S1107; otherwise, it returns the process to step S1101.

In step S1107, the CPU 101 stores the performance determination information after the setting change read out onto the RAM 103 in the ROM 102. Note that at this time, the performance determination information after the setting change may update that associated with the currently set imaging mode in the performance determination table in the ROM 102, or may be stored independently of that performance determination information.

In this way, the digital camera 100 which allows to switch whether or not each of the predetermined processes associated with imaging and playback is to be executed by the external apparatus according to the user's favor can be provided.

Modification

The aforementioned second embodiment has explained the method that allows the user to set the information as to whether or not each of the predetermined processes is to be executed by the external apparatus for each process. However, it is assumed that in, for example, a mode such as a manual imaging mode in which the user sets all settings from the beginning, it is troublesome to set all the processes without any expert knowledge. For this reason, this modification will explain a method of allowing the user to easily set information as to whether or not each of the predetermined processes is to be executed by the external apparatus.

<Manual Setting Process>

Figure 12:
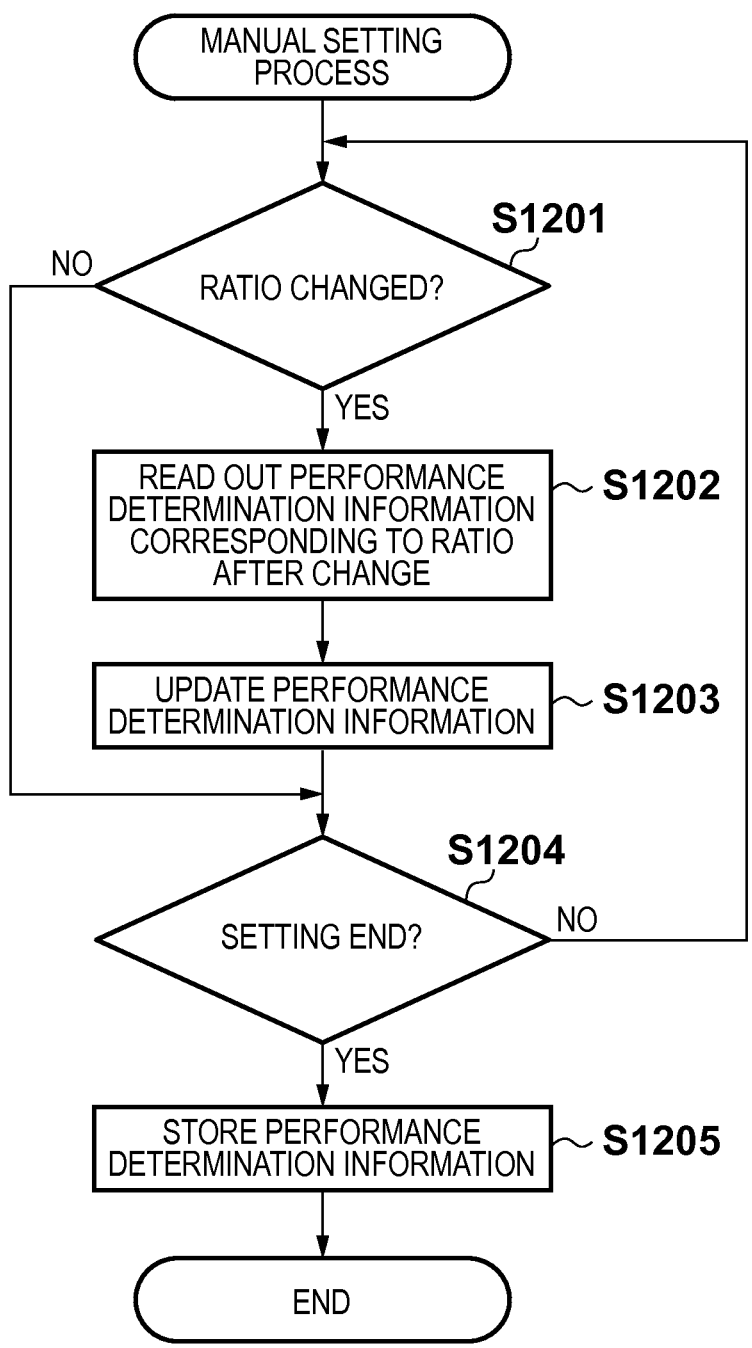
FIG. 12 is a flowchart showing an example of a manual setting process according to a modification of the present invention.

A practical manual setting process of the digital camera 100 of this modification will be described below with reference to the flowchart shown in FIG. 12. The processing corresponding to this flowchart can be implemented when the CPU 101 reads out a corresponding processing program stored in, for example, the ROM 102, extracts the readout program onto the RAM 103, and executes the extracted program. Note that the following description will be given under the assumption that this manual setting process is started, for example, when the CPU 101 receives, from the operation input unit 111, a control signal indicating that the user inputs a display instruction of the cloud performance process menu.

Note that in the cloud performance process menu of this modification, the user is allowed to change a ratio of processes to be performed by the external apparatus without setting any information as to whether or not each of the predetermined processes is to be performed by the external apparatus. In this modification, assume that a ratio of processes to be performed by the external apparatus is set level by level in association with performance of the predetermined processes, and information indicating processes to be performed by the external apparatus (performance determination information) is set for each level. Assume that the information indicating processes to be performed by the external apparatus for each level is stored in the ROM 102, and when the user changes the ratio, the CPU 101 reads out information indicating processes to be performed by the external apparatus, which information is stored in association with the changed ratio.

In the following description, when a control signal corresponding to a display instruction of the cloud performance process menu is received from the operation input unit 111 while the manual imaging mode is set, the CPU 101 refers to information of the currently set ratio which is stored in the ROM 102. Then, assume that the CPU 101 reads out the performance determination information associated with the currently set ratio onto the RAM 103. Note that when the imaging mode which allows the user to manually change settings is not set, the CPU 101 performs the manual setting process described in the second embodiment.

The CPU 101 determines in step S1201 whether or not a change input of a ratio of processes to be performed by the external apparatus is made. More specifically, the CPU 101 determines whether or not the change input of the ratio is made by checking whether or not a control signal output from the operation input unit 111 when an input related to a ratio change instruction is made is received. If the CPU 101 determines that the change input of the ratio is made, it advances the process to step S1202; otherwise, to step S1204.

In step S1202, the CPU 101 reads out performance determination information associated with the changed ratio from the ROM 102. Then, the CPU 101 updates the performance determination information associated with the ratio before change stored in the RAM 103 by the readout information in step S1203.

The CPU 101 determines in step S1204 whether or not a setting end input in the cloud performance process menu is made. More specifically, the CPU 101 determines whether or not the setting end input is made by checking whether or not a control signal output from the operation input unit 111 at the time of issuance of a setting end instruction is received. If the CPU 101 determines that the setting end input is made, it advances the process to step S1205; otherwise, it returns the process to step S1201.

In step S1205, the CPU 101 stores the performance determination information after the setting change read out onto the RAM 103 in the performance determination table in the ROM 102 as that associated with the manual imaging mode. Note that the information after the setting change may be stored not as the performance determination information but simply as information indicating (a level of) a ratio after the setting change in association with the manual imaging mode.

In this way, the digital camera 100 which allows the user to easily set each of the predetermined processes associated with imaging and playback without any sufficient knowledge can be provided.

Third Embodiment

In the description of the performance determination process of the aforementioned first embodiment, when a response to the processing instruction of the target process cannot be received, the target process is performed by the digital camera 100. This embodiment will explain a method of changing performance of a process to the digital camera 100 in another predetermined situation in which any process is not assigned to the external apparatus.

<Exception Process>

A practical exception process of the digital camera 100 of this embodiment will be described below with reference to the flowchart shown in FIG. 13. The processing corresponding to this flowchart can be implemented when the CPU 101 reads out a corresponding processing program stored in, for example, the ROM 102, extracts the readout program onto the RAM 103, and executes the extracted program. Note that the following description will be given under the assumption that this exception process is started when the performance determination information associated with the current imaging mode is read out onto the RAM 103 in step S701 of the performance determination process for each of the predetermined processes.

The CPU 101 determines in step S1301 whether or not the communication unit 107 is in a communication disabled state with the external apparatus. Assume that the communication disabled state indicates a state in which the digital camera 100 is disconnected from the external apparatus due to an arbitrary communication trouble (for example, when the digital camera 100 is not located under a wireless LAN environment, or when the external apparatus is not located in the network). If the CPU 101 determines that the communication unit 107 is in the communication disabled state with the external apparatus, it advances the process to step S1302; otherwise, to step S1303.

In step S1302, the CPU 101 selects an imaging mode in which processing parameters in respective processes are set as those similar to the current imaging mode out of imaging modes of the digital camera 100 in which all of the predetermined processes are performed on the digital camera 100. In this embodiment, assume that an imaging mode including similar processing parameters is set in advance as that in which at least some of the predetermined processes are performed by the external apparatus. Information of the similar imaging mode need only be stored in, for example, the ROM 102. In this step, the CPU 101 sets the imaging mode set as that similar to the current imaging mode as the currently set imaging mode, and reads out performance determination information associated with that imaging mode onto the RAM 103, thus ending this exception process.

On the other hand, if it is determined in step S1301 that the communication unit 107 is not in the communication disabled state with the external apparatus, the CPU 101 determines in step S1303 whether or not the current imaging setting is that to perform flash imaging including light amount control. More specifically, the CPU 101 refers to information of the current flash setting stored in the ROM 102, and determines whether or not that setting is a flash setting including light amount control. If the CPU 101 determines that the current imaging setting is that to perform flash imaging including light amount control, it advances the process to step S1306; otherwise, to step S1304.

The CPU 101 determines in step S1304 whether or not the current imaging setting is that to perform continuous imaging. More specifically, the CPU 101 refers to information of the current continuous imaging setting stored in the ROM 102, and determines whether or not that setting is a setting to perform continuous imaging. If the CPU 101 determines that the current imaging setting is that to perform continuous imaging, it advances the process to step S1306; otherwise, to step S1305.

The CPU 101 determines in step S1305 whether or not the current imaging setting is that to perform moving image imaging. More specifically, the CPU 101 refers to information of the current moving image imaging setting stored in the ROM 102, and determines whether or not that setting is a setting to perform moving image imaging. If the CPU 101 determines that the current imaging setting is that to perform moving image imaging, it advances the process to step S1306; otherwise, to step S1307.

In step S1306, the CPU 101 forcibly changes the current setting to a setting in which the image recognition process and image effect applying process are to be performed by the digital camera 100 of the performance determination information associated with the current imaging mode, which information is read out onto the RAM 103, thus ending this exception process. As for the flash imaging including light amount control, since the light amount control is performed and a plurality of flash light may be applied on the digital camera 100, it is preferable to perform the above two processes in the digital camera 100 which can easily recognize the information of the light amount control. As for the continuous imaging including the moving image imaging, since a quick response of the processes is required, it is preferable to perform the above two processes in the digital camera 100. For this reason, in this exception process, whether or not a corresponding situation is set is determined in steps S1303 to S1305. In the corresponding situation, the CPU 101 forcibly changes performance of the image recognition process and image effect applying process to the digital camera 100.

The CPU 101 determines in step S1307 whether or not the remaining amount of a battery (not shown) connected to the digital camera 100 is equal to or smaller than a threshold. The battery remaining amount is confirmed by, for example, a dedicated circuit or by executing a confirmation program. If the CPU 101 determines that the battery remaining amount is equal to or smaller than the threshold, it advances the process advances to step S1308; otherwise, it ends this exception process.

In step S1308, the CPU 101 forcibly changes the execution information associated with the current imaging mode, which information is read out onto the RAM 103, to a setting in which all of the predetermined processes are to be performed by the external apparatus, thus ending this exception process. When the battery remaining amount is small, if the external apparatus is instructed to perform many processes, the processes to be performed by the digital camera 100 can be suppressed. That is, even when the battery remaining amount is small, since the predetermined processes can be performed by consuming only electric power associated with a communication, more images can be captured.

As described above, the digital camera 100 which can forcibly switch performance of processes between itself and external apparatus according to its own state, and suitably controls performance of the predetermined processes can be provided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-005657, filed Jan. 13, 2012, which is hereby incorporated by reference herein in its entirety.

What is claimed is:

1. An image sensing apparatus comprising:
a setting unit configured to set one of a plurality of image sensing modes;
an image sensing unit configured to obtain an image of an object;
a processing unit configured to perform image processing on the image obtained by the image sensing unit based on the image sensing mode set by the setting unit, the image processing including a plurality of processes;
a communication unit configured to communicate with an external apparatus; and
a determination unit configured to determine, based on the image sensing mode set by the setting unit, which of the image sensing apparatus and the external apparatus is to perform a predetermined process out of the plurality of processes on the image obtained by the image sensing unit,
wherein in a case that the determination unit determines that the image sensing apparatus is to perform the predetermined process, the processing unit performs the predetermined process on the image obtained by the image sensing unit, and
wherein in a case that the determination unit determines that the external apparatus is to perform the predetermined process, the communication unit transmits the image obtained by the image sensing unit to the external apparatus so that the predetermined process is performed by the external apparatus.

2. The apparatus according to claim 1, further comprising a management unit configured to manage information indicating a process to be performed by the external apparatus out of the plurality of processes for each image sensing mode,
wherein the determination unit determines the process to be performed by the external apparatus based on the information managed by the management unit.

3. The apparatus according to claim 1, wherein the determination unit determines the process to be performed by the external apparatus before the image obtention by the image sensing unit is started.

4. The apparatus according to claim 2, further comprising a change unit configured to change the information managed by the management unit in accordance with a user operation.

5. The apparatus according to claim 1, wherein in a case that the communication unit cannot communicate with the external apparatus, the plurality of processes are performed by the image sensing apparatus.

6. The apparatus according to claim 1, wherein the plurality of processes include an image recognition process, and
wherein in a case that a mode for capturing an image of a person is set as the image sensing mode by the setting unit, the determination unit determines the image recognition process as the process to be performed by the external apparatus.

7. The apparatus according to claim 6, wherein the determination unit further determines a process to be performed by the image sensing apparatus out of the plurality of processes, and
wherein in a case that a mode for capturing an image of a landscape is set as the image sensing mode by the setting unit, the determination unit determines the image recognition process as the process to be performed by the image sensing apparatus.

8. The apparatus according to claim 1, further comprising a display unit,
wherein the display unit displays the predetermined process to be performed by the external apparatus.

9. The apparatus according to claim 1, further comprising a display unit,
wherein the display unit displays a representation for identifying which of the image sensing apparatus and the external apparatus perform the predetermined process as a result of a determination by the determination unit.

10. The apparatus according to claim 8, wherein the displaying by the display unit is performed before the image obtention by the image sensing unit is started.

11. A control method of an image sensing apparatus, comprising:
setting one of a plurality of image sensing modes;
obtaining an image of an object;
performing image processing to the obtained image based on the set image sensing mode, the image processing including a plurality of processes; and
determining, based on the set image sensing mode, which of the image sensing apparatus and an external apparatus is to perform a predetermined process out of the plurality of processes on the image obtained by the obtained image,
wherein in a case that it is determined that the image sensing apparatus is to perform the predetermined process, performing the predetermined process to the obtained image, and
wherein in a case that it is determined that the external apparatus is to perform the predetermined process, transmitting the obtained image to the external apparatus so that the predetermined process is performed by the external apparatus.

12. A non-transitory recording medium recording a program for controlling a computer to execute respective operations of a control method of an image sensing apparatus of claim 11.

13. The apparatus according to claim 9, wherein the representation by the display unit is performed before the image sensing process by the image sensing process is started.

14. The apparatus according to claim 1, wherein the image sensing apparatus and the external apparatus communicate via a network.

15. The apparatus according to claim 14, wherein the external apparatus is a server apparatus.

16. The apparatus according to claim 14, wherein the external apparatus provides a cloud service.

17. An image sensing apparatus comprising:
a setting unit configured to set one of a plurality of image sensing modes;
an image sensing unit configured to obtain an image of an object;
a processing unit configured to perform image processing on the image obtained by the image sensing unit based on the image sensing mode set by the setting unit, the image processing including a plurality of processes;
a communication unit configured to communicate with an external apparatus; and
a determination unit configured to determine, based on the image sensing mode set by the setting unit, a process to be performed by the external apparatus and a process to be performed by the image sensing apparatus out of the plurality of processes on the image obtained by the image sensing unit,
wherein the communication unit transmits the image obtained by the image sensing unit to the external apparatus so that the process determined by the determination unit is performed by the external apparatus, and
wherein the plurality of processes include an image recognition process, and in a case that a mode for capturing an image of a person is set as the image sensing mode by the setting unit, the determination unit determines the image recognition process as the process to be performed by the external apparatus, and in a case that a mode for capturing an image of a landscape is set as the image sensing mode by the setting unit, the determination unit determines the image recognition process as the process to be performed by the image sensing apparatus.

18. A control method of an image sensing apparatus, comprising:
setting one of a plurality of image sensing modes;
obtaining an image of an object;
performing image processing on the obtained image based on the set image sensing mode, the image processing including a plurality of processes;
determining, based on the set image sensing mode, a process to be performed by an external apparatus and a process to be performed by the image sensing apparatus out of the plurality of processes on the obtained image; and
transmitting the obtained image to the external apparatus so that the determined process is performed by the external apparatus,
wherein the plurality of processes include an image recognition process, and in a case that the set image sensing mode is a mode for capturing an image of a person, the image recognition process is determined as the process to be performed by the external apparatus, and in a case that the set image sensing mode is a mode for capturing an image of a landscape, the image recognition process is determined as the process to be performed by the image sensing apparatus.

* * * * *